United States Patent [19]

Henry-Moore

[11] Patent Number: 5,187,997
[45] Date of Patent: Feb. 23, 1993

[54] VEHICLE STEERING COLUMN COUPLING

[75] Inventor: Nicholas Henry-Moore, Northamptonshire, England

[73] Assignee: The Torrington Company, Torrington, Conn.

[21] Appl. No.: 795,364

[22] Filed: Nov. 20, 1991

[30] Foreign Application Priority Data

Feb. 20, 1991 [GB] United Kingdom ............... 9103518

[51] Int. Cl.⁵ .......................... B62D 1/18; F16D 3/64
[52] U.S. Cl. .................................... 74/493; 403/372; 403/377; 464/89; 464/97; 464/162
[58] Field of Search .......................... 74/493; 280/775; 403/109, 372, 377, 359; 464/89, 97, 162

[56] References Cited

U.S. PATENT DOCUMENTS

| | | | |
|---|---|---|---|
| 2,272,900 | 2/1942 | Saurer | 64/11 |
| 3,399,549 | 9/1968 | Nagele | 464/162 X |
| 3,922,928 | 12/1975 | Kester | 464/162 X |
| 4,573,946 | 3/1986 | Brissette | 464/162 X |
| 4,962,944 | 10/1990 | Reiche et al. | 280/775 |
| 5,086,661 | 2/1992 | Hancock | 74/493 |

FOREIGN PATENT DOCUMENTS

| | | |
|---|---|---|
| WO87/03258 | 6/1987 | Australia . |
| 2847541 | 11/1978 | Fed. Rep. of Germany . |
| 1395320 | 5/1975 | United Kingdom . |
| 2236168 | 3/1991 | United Kingdom . |

Primary Examiner—Allan D. Herrmann
Attorney, Agent, or Firm—Michael H. Minns

[57] ABSTRACT

A vehicle steering column which has an adjustable reach coupling in the form of a torsion bushing. The steering column has a first and second part which are slidably mounted one within the other and interconnected by the torsion bushing so as to absorb rotational backlash between the two parts of the steering column while transmitting torque through the two parts. The torsion bushing has first, second, and third zones continuous with one another and arranged so that the first and second zones are connected by the third zone and wherein the first and second zones are twisted relative to each other.

19 Claims, 5 Drawing Sheets

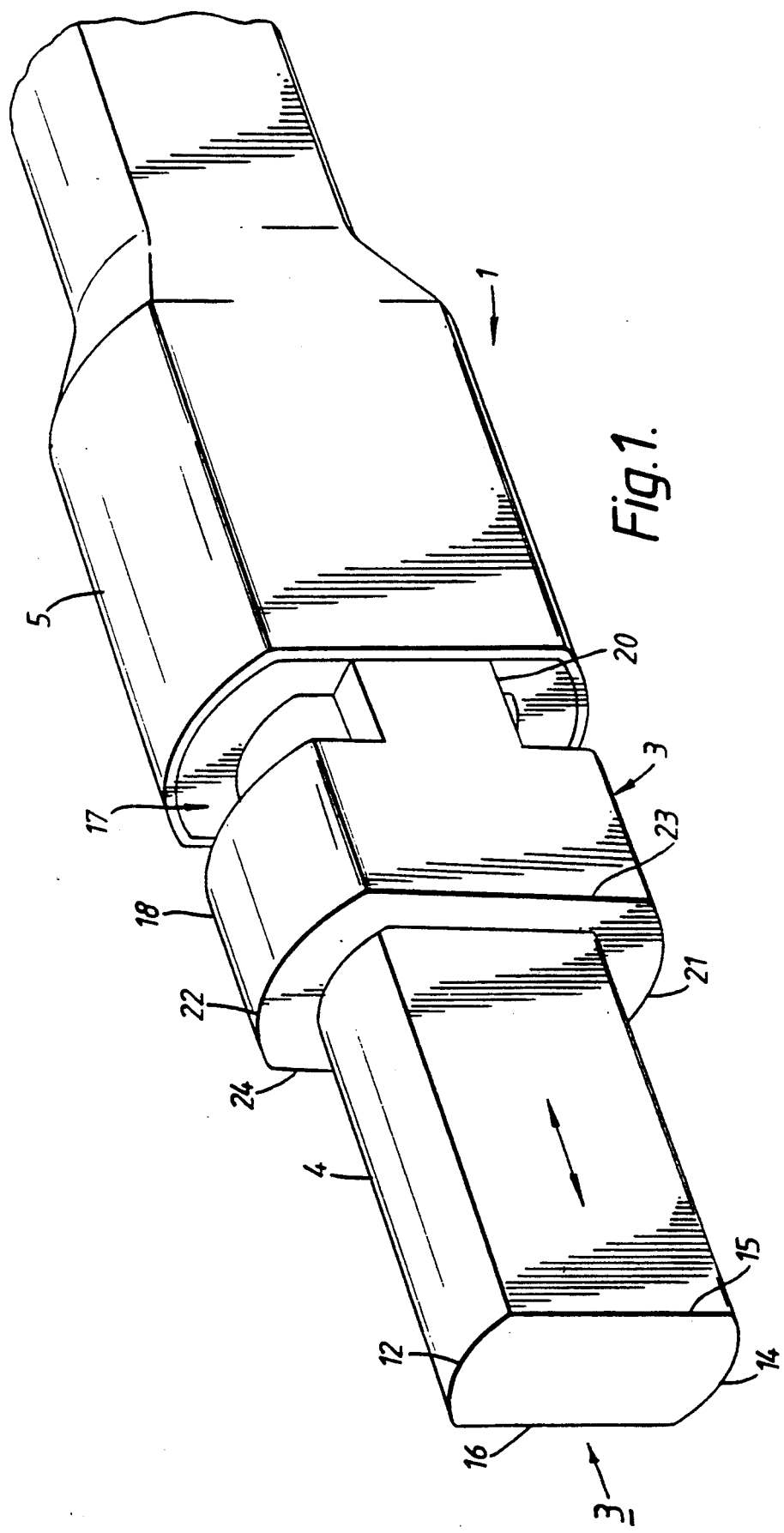

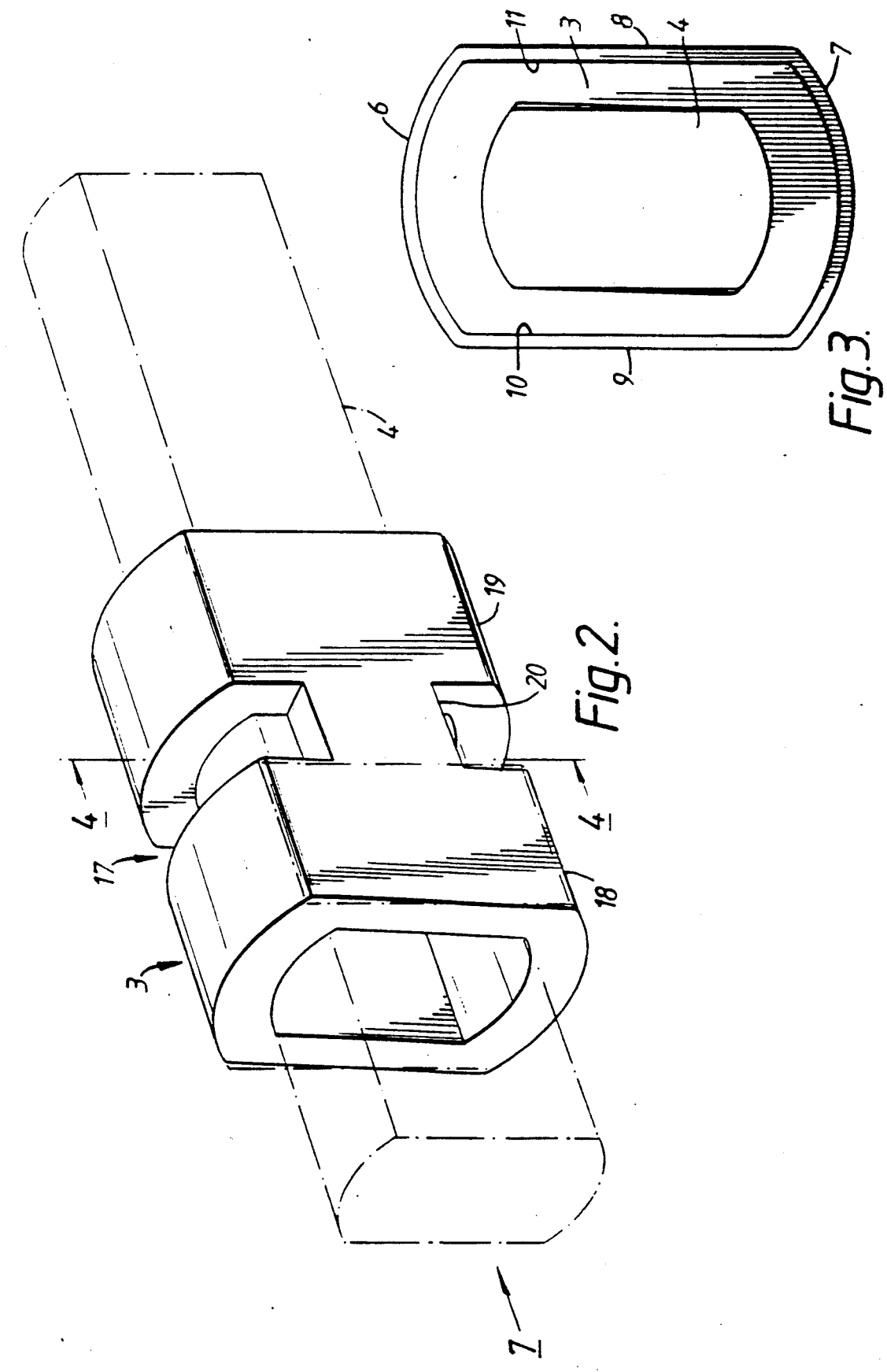

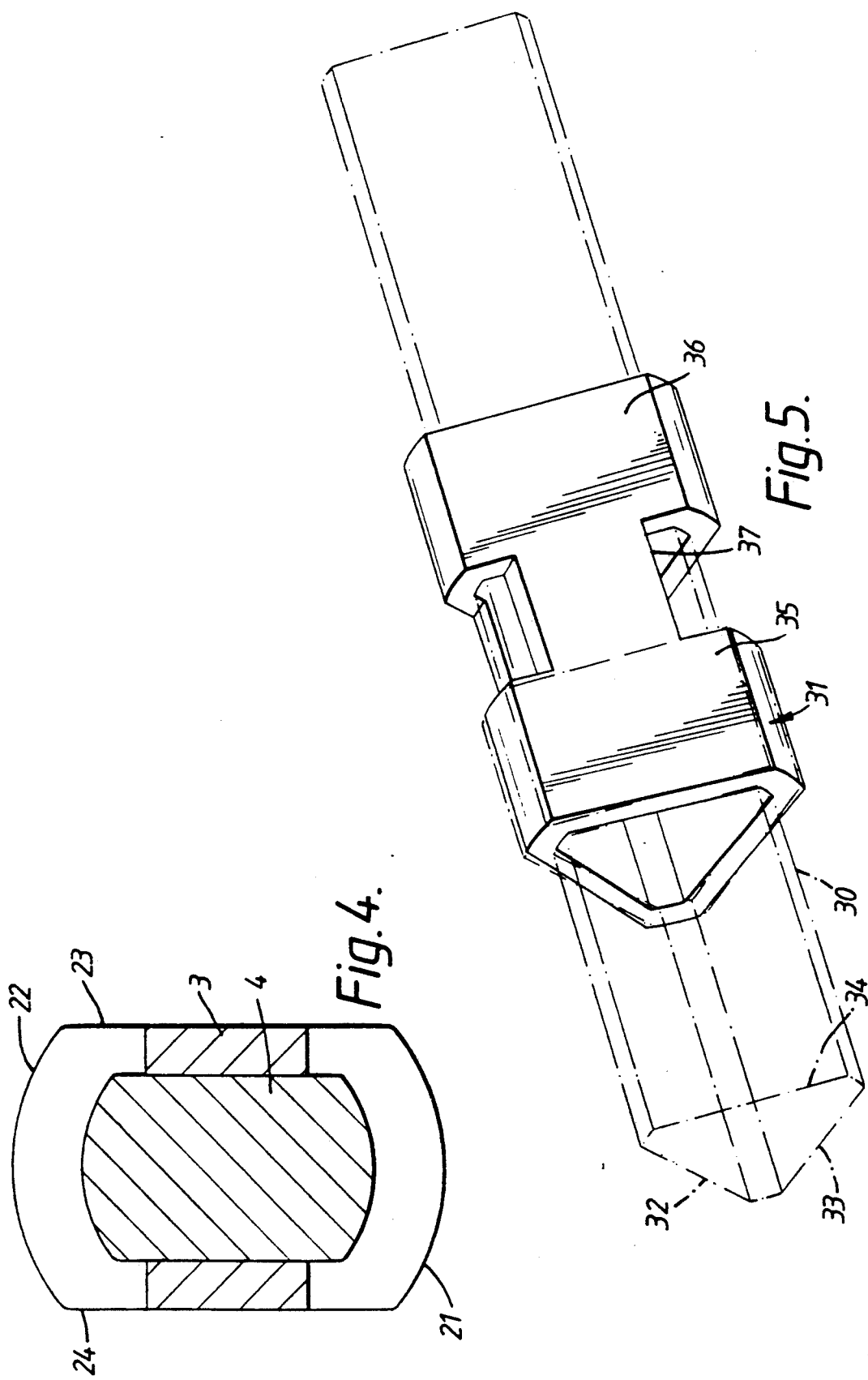

VEHICLE STEERING COLUMN COUPLING

This application is related to copending U.S. patent application Ser. No. 571,711, filed Aug. 24, 1990, now U.S. Pat. No. 5,086,661.

BACKGROUND OF THE INVENTION

This invention relates to a vehicle steering column incorporating an extensible coupling means or adjustable reach facility.

An adjustable reach facility is one which permits the steering column to be moved in an axial direction relative to itself so as to move the steering wheel to a position to suit the comfort of the driver. In order to achieve this, the steering column includes two parts which can slide relatively to one another.

SUMMARY OF THE INVENTION

In one aspect of the invention, this is provided by a vehicle steering column having a coupling between two portions of the steering column. The coupling incorporates means for providing preloaded torque resistance to inhibit transmission of rotational backlash through the steering column, the coupling comprising a torsion bushing having first, second and third zones contiguous with each other, the first and second zones being connected by the third zone and the first and second zones being angularly offset one from the other.

The foregoing and other aspects will become apparent from the following detailed description of the invention when considered in conjunction with the accompanying drawing figures.

BRIEF DESCRIPTION OF THE DRAWING FIGURES

FIG. 1 is a diagrammatic perspective view of part of a vehicle steering column coupling means according to one embodiment of the invention;

FIG. 2 is a diagrammatic perspective view of an inner element shown in FIG. 1 and showing more completely the construction of a coupling means shown in FIG. 1;

FIG. 3 is a view taken in the direction of the arrow 3 in FIG. 1;

FIG. 4 is a cross-sectional view of FIG. 2 along the line 4—4;

FIG. 5 is a perspective view of an inner means and showing more completely the construction of a coupling means according to another embodiment of the invention;

DETAILED DESCRIPTION

Figure 1A:
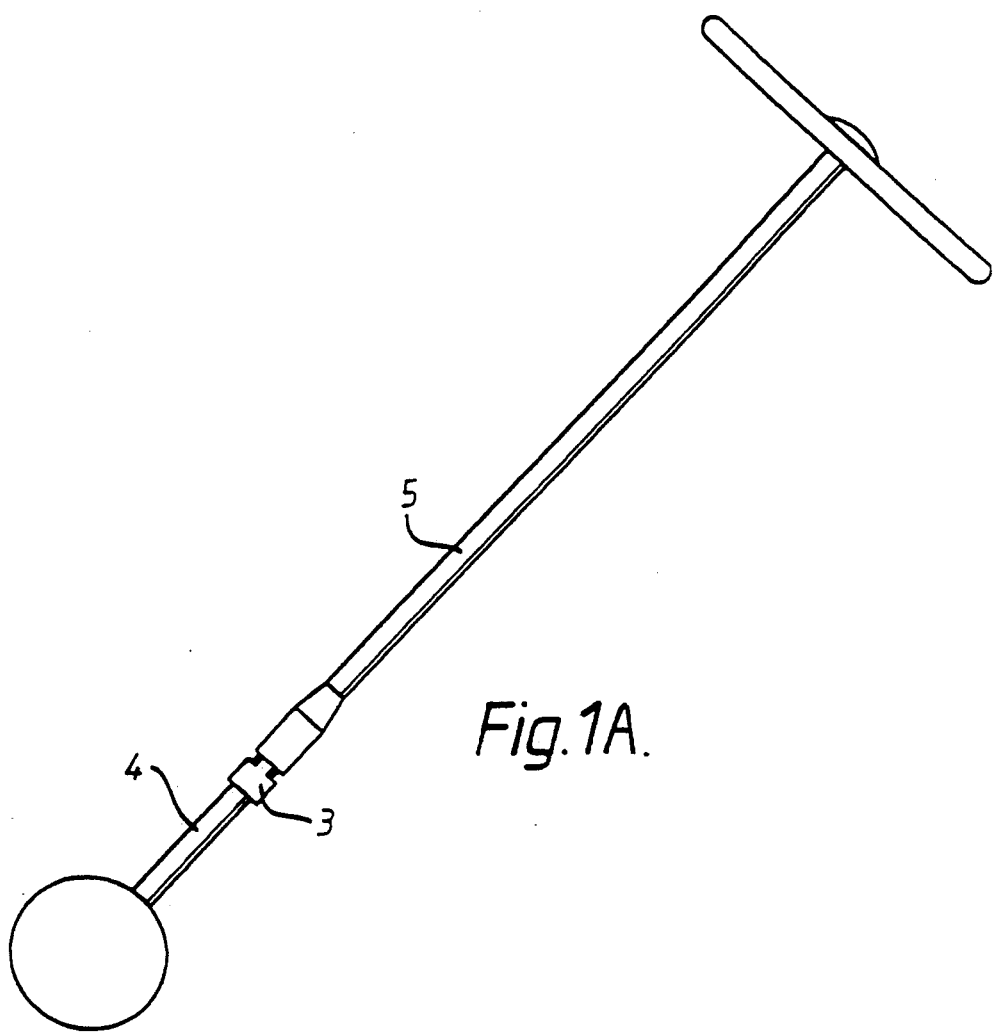
FIG. 1A is a diagrammatic perspective view of a vehicle steering column incorporating the steering column coupling means shown in FIG. 1.

According to the present invention, there is provided a vehicle steering column incorporating an extensible coupling means or adjustable reach facility to absorb rotational backlash between two parts connected thereby, while maintaining a facility to transmit torque through the two parts.

One of the two parts can be a tube or hollow shaft, while the other of the two parts can be a hollow or solid shaft and the coupling means may be in the form of a torsion bushing interconnecting these parts. With this arrangement, the torsion bushing can be partially fitted inside one end of the hollow tube or shaft and another part of the torsion bushing is fitted over one end of the other part.

The torsion bushing may have first, second and third zones continuous with each other and arranged so that the first and second zones are connected by means of the third zone and are twisted relative to each other. The degree of twist depends on the functional requirement but is preferably 1°–5° from the longitudinal axis through a fixed zone. The preferred embodiment is at least 2° from the longitudinal axis through a fixed zone.

The shafts may be of any shape suitable to be coupled together by the coupling means so that rotational backlash does not occur and the coupling means is under constant torque. The shafts may be substantially rectangular in shape with curved shorter ends, the coupling means being dimensioned to couple together the shafts. The shafts may also be substantially triangular in shape with the coupling means dimensioned to couple together the shafts.

The degree of twist of the coupling means is termed the spring rate of the proposed torsion and is calculated from the following basic formula:

$$\theta = \frac{TL}{JG}$$

$\theta$ = Angle of twist per unit length
T = Applied torque
L = Length of bushing
J = Polar moment of inertia
G = shear modulus of elasticity.

For different configurations made in similar materials, the Polar moment of inertia is the only parameter which changes, i.e., $$J = \frac{bh}{12}(h^2 + b^2) \text{ for a rectangle.}$$

With reference to the figures, there is shown part of a vehicle steering column incorporating an extensible coupling means in the form of a torsion bushing 3.

The extensible coupling means 1 comprises hollow shaft 5, shaft 4 and the torsion bushing 3. The torsion bushing 3 comprises three zones, 18, 19 and 20. The second zone 19 of the bushing 3 is mounted in one end of the hollow outer shaft 5. The solid inner shaft 4 has one end slidably mountable within the torsion bushing 3 so that it can be moved in an axial direction relative to the shaft 5.

The outer shaft 5 is made of steel and is substantially rectangular in cross-section with curved shorter ends 6 and 7 and flat side walls 8 and 9 on both its outer and inner surfaces 10 and 11 respectively. The shaft 5 has an expanded portion at the one end so as to accommodate the inner shaft 4 and the torsion bushing 3.

The inner shaft 4 has a substantially rectangular cross-section with curved shorter ends 12 and 14 and flat side walls 15 and 16 and is dimensioned so as to be slidably mountable within the torsion bushing 3 and the shaft 5. The inner shaft 4 is the product of a cylinder originally having a diameter of 19 mm which was formed to form the flat side walls 12 and 14 spaced 14 mm apart.

Figure 7:
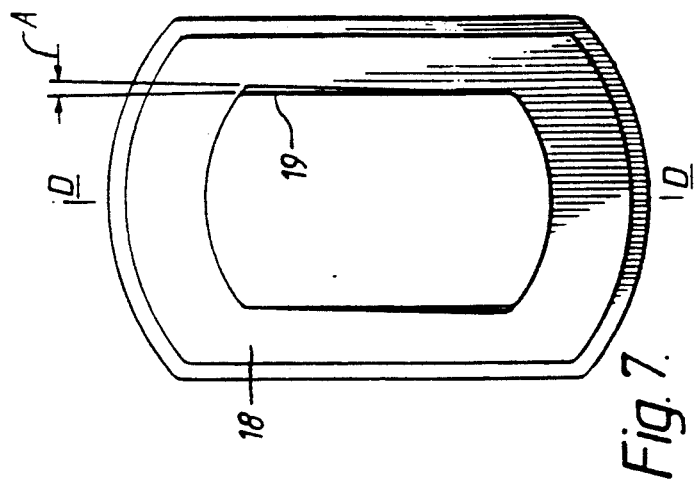

Specifically with reference to FIGS. 2 and 7, the torsion bushing 3 has a hollow tubular cross-sectional shape and comprises first, second and third zones 18, 19, and 20 which are shown to be constructed continuously with one another, with the first and second zones 18 and 19 being connected by the third zone 20. The first and second zones 18 and 19 are arranged so that the longitudinal axis through the first zone 18 is offset by angle A from the longitudinal axis through the second zone 19, the longitudinal axis for the second zone being along the line D—D. Angle A is preferably 1°-5°. Both the inner and outer surfaces of the first and second zones 18 and 19 have a substantially rectangular cross-section with curved shorter ends 21 and 22 and the flat side walls 23 and 24. The third zone 20 forms a cut away section 17 enabling the first and second zones 18 and 19 to flex tortionally relative to each other.

The torsion bushing 3 is arranged to couple together the inner and outer shafts 4 and 5 and its second zone 19 is mounted in the expanded portion of the outer shaft 5. The first zone 18 and connecting, third zone 20 extend outwardly of the expanded portion over the one end of the inner shaft 4. An alternative embodiment has the third zon 20 extending inside of inner shaft 4.

With reference to FIG. 2, the shaft 4, shown in phantom, is mounted within the torsion bushing 3. The change in alignment of the first zone 18, relative to the second zone 19 for the vehicle steering column in its assembled form, is indicated by broken lines and shows that in order for the shaft 4 to be mounted within the torsion bushing 3, the first zone 18 must be flexed so that its longitudinal axis is along the line D—D corresponding with the longitudinal axis of the second zone 19. The dimension of the third zone 20 is a factor in determining the degree of flex that can occur between the first and second zones 18 and 19. Therefore, when the vehicle steering column is in its assembled form, the torsion bushing 3 is under constant torque which construction prevents rotational backlash of the inner and outer shafts 4 and 5.

This arrangement, therefore, has the advantage that the torsion bushing 3 absorbs any rotational backlash between the inner and outer shafts 4 and 5 while maintaining the facility to transmit torque through the shafts 4 and 5.

In another embodiment of the invention, the inner shaft 4 may be a hollow shaft.

With reference to FIG. 5, there is shown another embodiment of the invention wherein an inner solid tube 30 is slidably mounted within a coupling means 31. The tube 30 is substantially triangular in cross-section having three equilateral sides 32, 33, and 34.

The coupling means 31 has first, second, and third zones 35, 36, and 37, the first and second means 35 and 36 being connected by the cut away third zone 37. The first and second zones 35 and 36 are twisted relative to each other. The second zone 36 of the coupling means 31 is fixed to one end of an outer tube (not shown).

Figure 6:
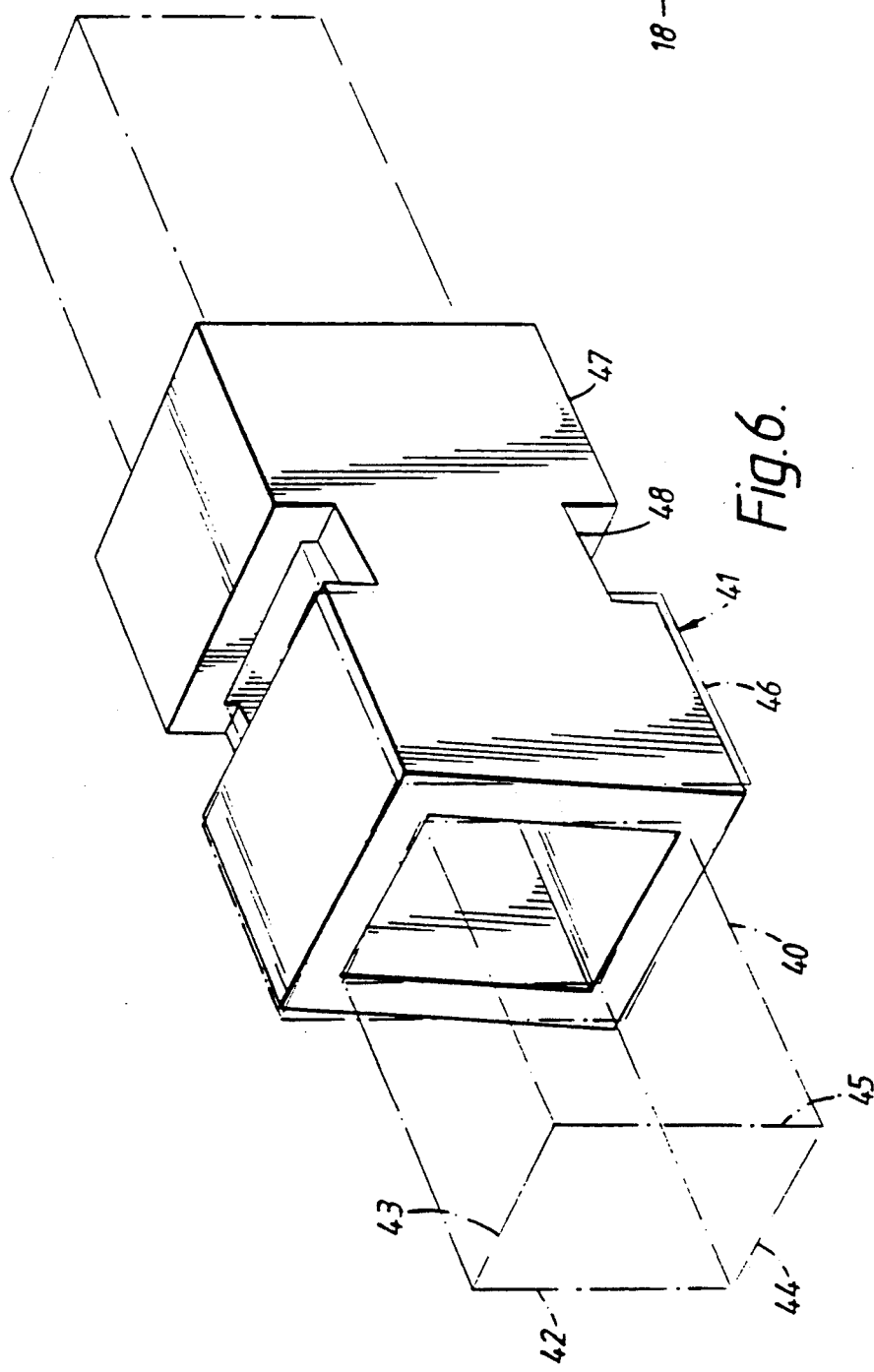
FIG. 6 is a perspective view of an inner means and showing more completely the construction of a coupling means according to a further embodiment of the invention; and, FIG. 7 is a view of the torsion bushing taken in the direction of the arrow 7 in FIG. 2.

With reference to FIG. 6, there is shown a further embodiment of the invention wherein an inner solid tube 40 is slidably mounted within a coupling means 41. The tube 30 is substantially square in cross-section having sides 42, 43, 44, and 45.

The coupling means 41 has first, second, and third zones 46, 47, and 48, the first and second zones 46 and 47 being connected by the cut away third zone 48. The first and second zones 46 and 47 are twisted relative to each other.

The second zone 47 of the coupling means 41 is fixed to one end of an outer tube (not shown).

The shapes of the two portions of the steering column 4, 5 do not have to be the same. The size and shape of the inner shaft 4 must fit within the shaft 5. The preferred embodiment uses similar shapes for the inner shaft 4 and shaft 5.

Having described the invention, what is claimed is:

1. A vehicle steering column having a coupling between two portions of the steering column, which coupling incorporates means for providing preloaded torque resistance to inhibit transmission of rotational backlash through the steering column, the coupling comprising a torsion bushing having integral first, second and third zones contiguous with each other, the first and second zones being flexibly connected by the third zone and the first and second zones being angularly offset one from the other.

2. The vehicle steering column according to claim 1 wherein the torsion bushing permits the two portions of the steering column to move axially with respect to one another.

3. The vehicle steering column according to claim 1 wherein the first and second zones are twisted from 1° to 5° from a longitudinal axis through a fixed zone.

4. A vehicle steering column according to claim 3 wherein the second zone is the fixed zone and the second zone is fixedly mounted inside one portio of the steering column such that the first and third zones extend fro the second zone around the other portion of the steering column which is slidably mounted within the torsion bushing.

5. A vehicle steering column according to claim 1 wherein the torsion bushing has a tubular cross-sectional shape.

6. A vehicle steering column according to claim 5 wherein the third zone has at least one relieved portion.

7. A vehicle steering column according to claim 6 wherein the tubular cross-sectional shape is double D.

8. A vehicle steering column according to claim 6 wherein the tubular cross-sectional shape is rectangular.

9. A vehicle steering column according to claim 6 wherein the tubular cross-sectional shape is triangular.

10. A vehicle steering column having a coupling between two portions of the steering column, which coupling incorporates means for providing preloaded torque resistance to inhibit transmission of rotational backlash through the steering column, the coupling comprising a torsion bushing having a tubular cross-sectional shape and having integral first, second and third zones contiguous with each other, the first and second zones being flexibly connected by the third zone, the first and second zones being angularly offset one from the other, and the third zone having at least one relieved portion, the torsion bushing permitting the two portions of the steering column to move axially with respect to one another.

11. The vehicle steering column according to claim 10 wherein the first and second zones are twisted from 1° to 5° from a longitudinal axis through a fixed zone.

12. A vehicle steering column according to claim 11 wherein the second zone is the fixed zone and the second zone is fixedly mounted inside one portion of the steering column such that the first and third zones extend from the second zone around the other portion of the steering column which is slidably mounted within the torsion bushing.

13. A vehicle steering column according to claim 10 wherein the tubular cross-sectional shape is double D.

14. A vehicle steering column according to claim 10 wherein the tubular cross-sectional shape is rectangular.

15. A vehicle steering column according to claim 10 wherein the tubular cross-sectional shape is triangular.

16. A vehicle steering column incorporating an adjustable reach facility and coupling means to absorb rotational backlash between a first and second part connected thereby while transmitting torque through the two parts, the coupling means comprising a torsion bushing having integral first, second and third zones continuous with each other and arranged so that the first and second zones are flexibly connected by means of the third zone and are twisted relative to each other.

17. The vehicle steering column according to claim 16 wherein the first and second zones are twisted from 1° to 5° from a longitudinal axis through a fixed zone.

18. A vehicle steering column according to claim 17 wherein the second zone is the fixed zone and the second zone is fixedly mounted inside one portio of the steering column such that the first and third zones extend from the second zone around the other portion of the steering column which is slidably mounted within the torsion bushing.

19. A coupling for coupling two portion sof a vehicle steering coupling, the coupling comprising:
   a unitary torsion bushing having integral first, second and third zones, contiguous with each other, the first and second zones being flexibly connected by a third zone, the first and second zones being angularly offset from one another, the torsion bushing being formed of a resilient material.

* * * * *